United States Patent
Kobayashi et al.

(10) Patent No.: US 9,456,155 B2
(45) Date of Patent: Sep. 27, 2016

(54) IMAGE PROCESSING APPARATUS, METHOD, AND PROGRAM, AND IMAGE PICKUP APPARATUS HAVING IMAGE PROCESSING APPARATUS

(71) Applicant: CANON KABUSHIKI KAISHA, Tokyo (JP)

(72) Inventors: Hirokazu Kobayashi, Saitama (JP); Nobuhiro Takeda, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 51 days.

(21) Appl. No.: 13/975,517

(22) Filed: Aug. 26, 2013

(65) Prior Publication Data

US 2014/0055646 A1    Feb. 27, 2014

(30) Foreign Application Priority Data

Aug. 27, 2012   (JP) .................................. 2012-186697

(51) Int. Cl.
*H04N 5/357*    (2011.01)
*H04N 5/367*    (2011.01)

(52) U.S. Cl.
CPC .............. *H04N 5/367* (2013.01); *H04N 5/357* (2013.01)

(58) Field of Classification Search
CPC .. H04N 5/367; H04N 5/23229; H04N 5/357; H04N 5/3675; G06T 2207/10052
See application file for complete search history.

(56) References Cited

U.S. PATENT DOCUMENTS

| 7,280,142 B2 * | 10/2007 | Toyoda | H04N 9/045 348/243 |
| 2008/0193026 A1 * | 8/2008 | Horie | H04N 5/23293 382/238 |
| 2010/0265381 A1 * | 10/2010 | Yamamoto | G02B 27/0025 348/335 |

FOREIGN PATENT DOCUMENTS

| JP | 2005-026794 A | 1/2005 |
| JP | 2005-286825 A | 10/2005 |
| JP | 2008-118570 A | 5/2008 |
| JP | 2009-302722 A | 12/2009 |
| JP | 2010-154493 A | 7/2010 |
| JP | 2011-097645 A | 5/2011 |
| JP | 2012-134783 A | 7/2012 |

OTHER PUBLICATIONS

Ren Ng, et al., Light Field Photography with a Hand-held Plenoptic Camera, Stanford Tech Report CTSR 2005-2, pp. 1-11.
Office Action for corresponding Japanese Application No. 2012-186697 mailed Jul. 14, 2016.

* cited by examiner

*Primary Examiner* — Ahmed A Berhan
(74) *Attorney, Agent, or Firm* — Carter, DeLuca, Farrell & Schmidt, LLP

(57) ABSTRACT

An image processing apparatus obtains a picked-up image which is output from an image pickup element which includes a microlens array for obtaining the picked-up image including ray directional information of an object image formed by a photographing optical system, generates a reconstruction image by reconstructing the obtained picked-up image on the basis of the ray directional information, and detects a defect pixel of the generated reconstruction image.

15 Claims, 10 Drawing Sheets

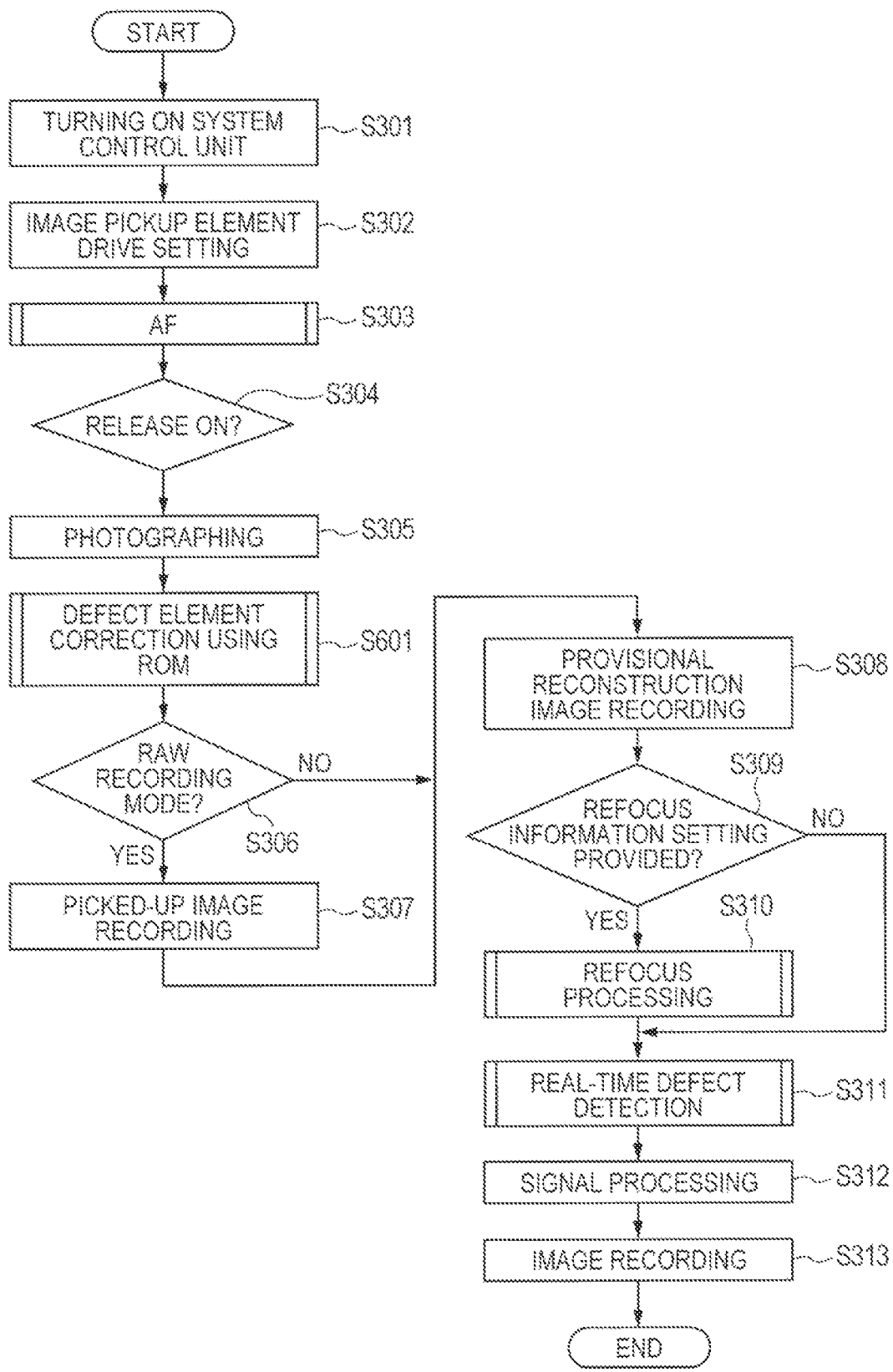

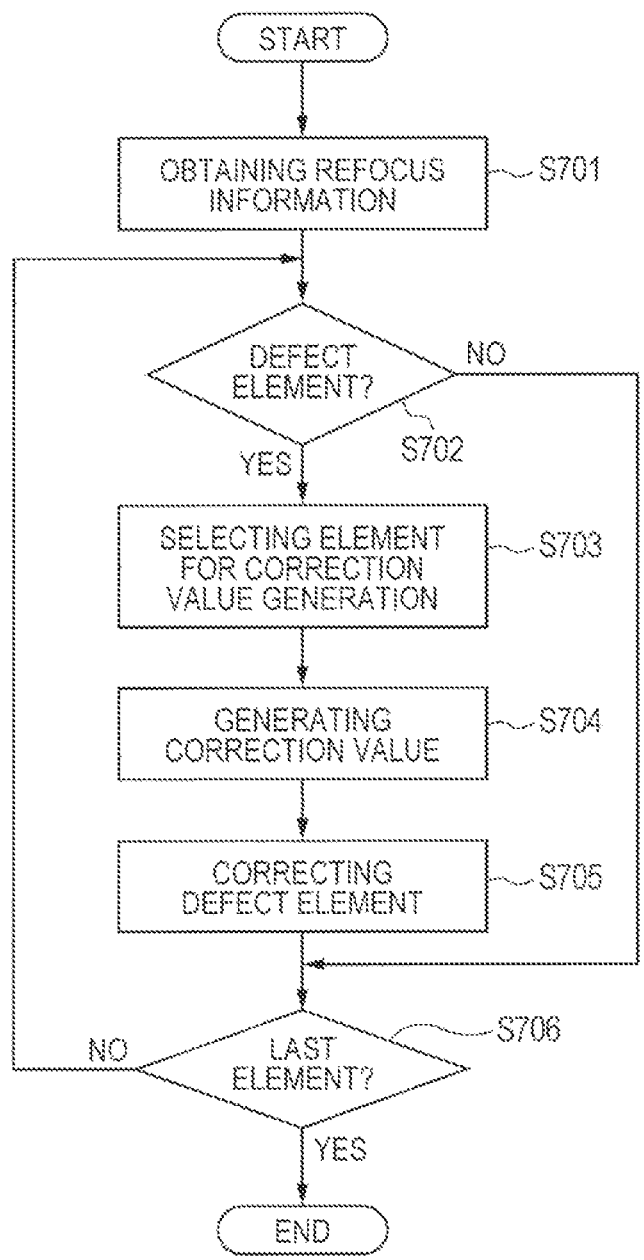

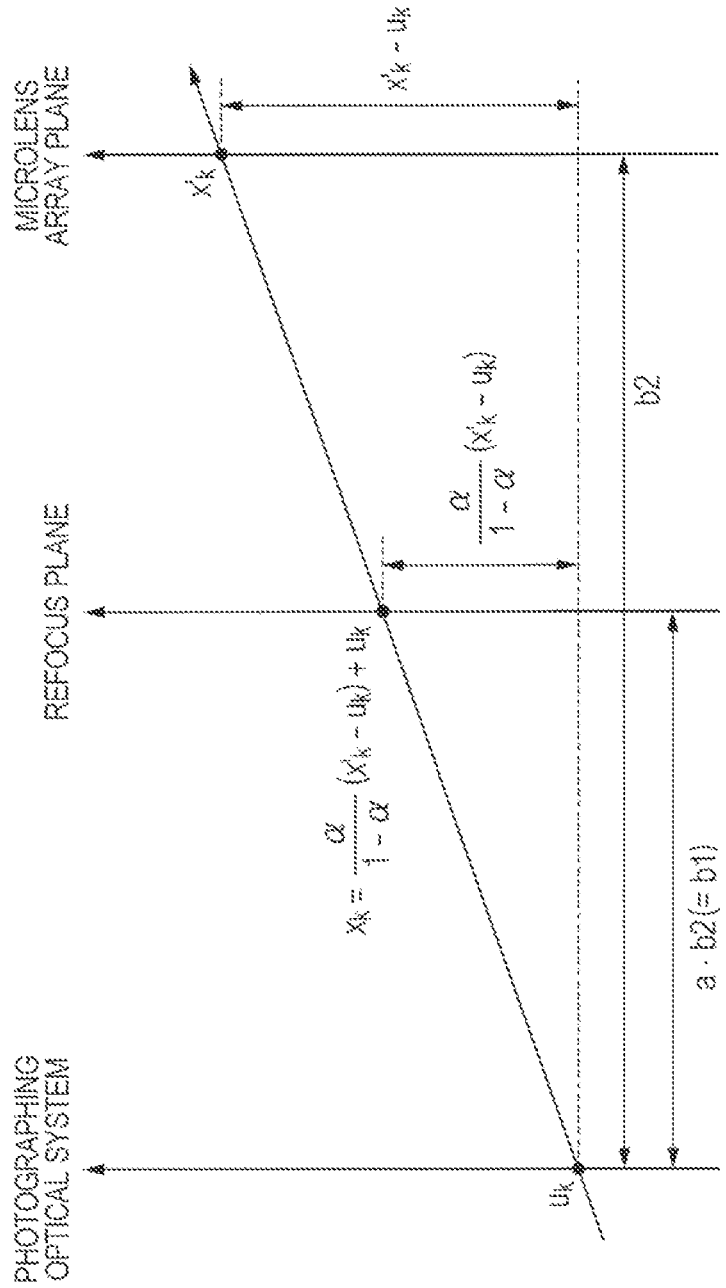

A: PIXEL FOR RECONSTRUCTION
B: DEFECT PIXEL
C: PIXEL FOR CORRECTION VALUE GENERATION

IMAGE PROCESSING APPARATUS, METHOD, AND PROGRAM, AND IMAGE PICKUP APPARATUS HAVING IMAGE PROCESSING APPARATUS

BACKGROUND OF THE INVENTION

1. Field of the Invention

The present invention relates to an image processing apparatus and, more particularly, to an image processing apparatus, an image processing method, and a program for detecting and correcting a defect pixel.

2. Description of the Related Art

In a recent digital image processing technique, a study field called a light field photography has remarkably been progressed. In the light field photography, first, an image pickup is performed so that a picked-up image including not only two-dimensional lighting information of a field of view but also ray directional information can be obtained by an image pickup apparatus including a photographing optical system such as lenses and the like and an image pickup element such as CCD, CMOS, or the like.

The picked-up image including the ray directional information corresponds to a picked-up image obtained with division into a number of pupils instead of division of a pair of pupils in what is called an auto focus detection (AF) of a phase-difference detection type. When such a picked-up image is directly observed, it (picked-up image) appears to be data which is not always information that is meaningfully arranged in meaningful order. However, by an image processing of a reconstruction type closely based on an image pickup step by which the picked-up image has been obtained, a refocus for newly focusing onto a desired object in the field of view after photographing can be performed. At present, the image pickup apparatus and image processing apparatus with such a construction have been proposed.

As an example of such image pickup apparatus and image processing apparatus, a Hand-held Plenoptic Camera (hereinbelow, referred to as a light field camera) disclosed in Non-Patent Literature 1 "Ren. Ng, et al., "Light Field Photography with a Hand-held Plenoptic Camera", Stanford Tech Report CTSR 2005-02" can be mentioned. The light field camera has an optical system for mainly forming an object image onto a "microlens" array having a predetermined pitch by a "main lens" serving as a photographing optical system in a normal image pickup apparatus. The light field camera also has an "image pickup element" for picking up the object image formed by such an optical system. The image pickup element is arranged behind the microlens array and has a plurality of photoelectric conversion elements of a pitch that is further smaller than the predetermined pitch.

In other words, the light field camera disclosed in the Non-Patent Literature 1 is a camera which can obtain an image having new information that is not provided in a well-known image pickup apparatus by a special image pickup step and an image processing which executes such a step as a prerequisite.

On the other hand, most of image processings which are executed by the normal image pickup apparatus are processings which are executed on the assumption that there is a continuity to a certain extent among signals of photoelectric conversion elements constructing the picked-up image. For example, there can be mentioned a real-time defect detecting method whereby each time the photographing is performed by the image pickup apparatus, a pixel is determined as a defect on the basis of level differences or the like between signals of that pixel and peripheral photoelectric conversion elements thereof. For example, a defect pixel correcting apparatus disclosed in Patent Literature 1 "the Official Gazette of Japanese Patent Application Laid-Open No. 2005-286825" has: a first defect pixel detection unit for detecting a defect pixel by comparing each of signals which are output from a plurality of pixels with a predetermined value; and a first correction unit for correcting a signal from the defect pixel detected by the first defect pixel detection unit. The defect pixel correcting apparatus further has a second defect pixel detection unit for detecting the defect pixel by comparing each of signals which are output from the plurality of pixels in which the correction to the defect pixel detected by the first defect pixel detection unit has been performed with a predetermined value. In such a construction, the defect pixel correcting apparatus of Patent Literature 1 is characterized by having a setting control unit for setting different values into the predetermined values of the first defect pixel detection unit and the second defect pixel detection unit.

According to Patent Literature 1, defect pixel information detected by the first defect pixel detection unit is stored, it is referred to by the second defect pixel detection unit, and whether the detected pixel is really a defect pixel or an object edge is discriminated. Patent Literature 1 also mentioned a point that when it is determined that the detected pixel is the object edge, the correction is not performed, so that an image quality obstruction can be prevented.

As will be also understood from the above description, a most important subject in the real-time defect detecting method is to discriminate whether the detected pixel is a defect pixel which should be a correction subject or the object edge.

A method whereby coordinates of a defect pixel which should be a correction subject are specified in, for example, a manufacturing step of an image pickup apparatus or an image pickup element and stored into a memory of the image pickup apparatus has also been proposed. An example of such an image processing apparatus is disclosed in Patent Literature 2 "the Official Gazette of Japanese Patent Application Laid-Open No. 2005-26794". The image processing apparatus of Patent Literature 2 has: a storing unit for storing correction data including position information of a defect pixel of an image pickup element and information regarding its output level; and a correction processing unit for executing a correction processing of the defect pixel of an output signal from the image pickup element by using the correction data. The correction processing unit obtains a discrimination value by multiplying a threshold value which is determined in accordance with conditions which are classified in accordance with photographing conditions and a photographing environment with a conversion coefficient which changes in dependence on coordinates in a display screen of a subject pixel, and extracts the defect pixel serving as a correction subject from the correction data by using the discrimination value as a reference. Thus, the correction processing can be executed to the defect pixel.

Patent Literature 2 also mentions performing a correction corresponds to an accumulation time of photoelectric conversion charges which substantially differ in dependence on vertical scanning rows, which correction is peculiar to a CMOS type image pickup element of what is called a rolling read-out method. Further, Patent Literature 2 also mentions that excess and deficiency of the defect correction are eliminated by this correction and an increase of system resources such as a defect pixel storing memory and the like can be relatively avoided.

As will be also understood from the above, for the image pickup apparatus having the defect pixel storing memory, an obtainment of a balance between the number of defect coordinates to be stored and an effect of the defect pixel correction is also a problem to be solved.

Terminologies which are used in the following description will be defined here. In the light field camera, a unit pixel constructing "picked-up image (including ray directional information)" is called "signal of a photoelectric conversion element" or simply called "signal", and a unit pixel constructing "reconstruction image" obtained by some reconstruction is called "pixel".

In the conventional image pickup apparatus, there is no need to clearly distinguish such a definition that a unit pixel constructing the picked-up image is generally called "pixel", a unit pixel constructing the image pickup element is called "signal of a photoelectric conversion element", and a unit pixel constructing the final image obtained through signal processings is called "pixel". However, for the light field camera, they are concepts which should be clearly distinguished from each other.

As mentioned above, in order to obtain a remarkable feature like a refocus reconstruction processing, for the light field camera, the special image pickup step occupies the important position as mentioned above. What the special image pickup step means is a simultaneous obtainment of the lighting information and the ray directional information. The ray directional information appears in intensity distribution of a number of photoelectric conversion elements corresponding to one of a plurality of microlenses constructing the microlens array. This provides such an image shift that the intensity distribution of the signals of a plurality of photoelectric conversion elements is deviated in accordance with a distance to the object and focusing of the photographing optical system. The image shift is such a phenomenon that the images constructed by the signals of the photoelectric conversion elements corresponding to the same quadrant of the microlens caused a deviation of coordinates, and this can be regarded as an expansion of a pair of image shifts in the phase-difference detection type AF to a number of image shifts.

That is, the picked-up image in which the signals of a number of photoelectric conversion elements are arranged in order of outputs from the image pickup elements without being subjected to some refocus reconstruction processing is data which is unsuitable to be directly observed.

Therefore, if the foregoing real-time defect detecting method which is performed on the assumption that there is continuity to a certain extent among the signals of the photoelectric conversion elements is merely applied to the picked-up image including the ray directional information, distinction of a defect pixel from the object edge, which is a problem to be solved is difficult.

Moreover, the light field camera has the special image pickup step as mentioned above and the photoelectric conversion elements of the pitch smaller than the pitch of the microlens array are disposed on the picked-up image. Therefore, even if a density of defects to be stored is same as that in the related art, the number of signals of the photoelectric conversion elements which should be correction subjects increases. Therefore, if it is intended to cope with it only by the storage of the correction subject coordinates as disclosed in Patent Literature 2, this results in a large increase of system resources such as a memory and the like. Therefore, it is difficult to avoid use or common-use of the real-time defect detection.

That is, when the above problems are summarized, in the case where the real-time defect detection and correction as mentioned above are performed to the light field camera, unless processing order of one type of or a plurality of types of defect detection and correction and the refocus reconstruction processing is accurately controlled, the following problems occur.

First, since the picked-up image includes the ray directional information, it includes the image shift. Therefore, in the picked-up image as it is, an image area in which it is difficult to distinguish the object edge and the defect exists.

Second, since the coordinates of the signals of the photoelectric conversion elements which contribute to the pixels on the reconstruction image are changed depending on the refocus reconstruction processing, the stored coordinate information of the defects cannot be directly applied.

Third, since the picked-up image is constructed by the signals of an extremely large number of photoelectric conversion elements, if the real-time defect detection is performed to all elements, it takes a long processing time, and on the contrary, if the coordinates of all of the defect elements are stored, system resources such as a memory and the like is increased.

SUMMARY OF THE INVENTION

In consideration of the above problems, it is an aspect of the invention to provide an image processing apparatus which enables a real-time defect detection processing to be efficiently executed and is suitable for the light field camera.

To accomplish the above aspect, according to the invention, an image processing apparatus obtains a picked-up image which is output from an image pickup element which includes a microlens array for obtaining a picked-up image including ray directional information of an object image formed by a photographing optical system, generates a reconstruction image by reconstructing the picked-up image obtained on the basis of the ray directional information, and detects a defect pixel of the generated reconstruction image.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 is a diagram illustrating a flowchart for the operation of the image pickup apparatus according to the second embodiment of the invention;

FIG. 7 is a diagram illustrating a flowchart for the defect correcting operation according to the embodiment of the invention;

FIG. 8 is a diagram illustrating a relation between a light flux which exits from a pupil division area of a photographing lens and enters a microlens and a passing position on a refocus plane;

DESCRIPTION OF THE EMBODIMENTS

Various exemplary embodiments, features, and aspects of the present invention will be described in detail below with reference to the drawings.

First Embodiment

First, a whole construction of an image pickup apparatus according to an embodiment of the invention will be described.

Figure 1:
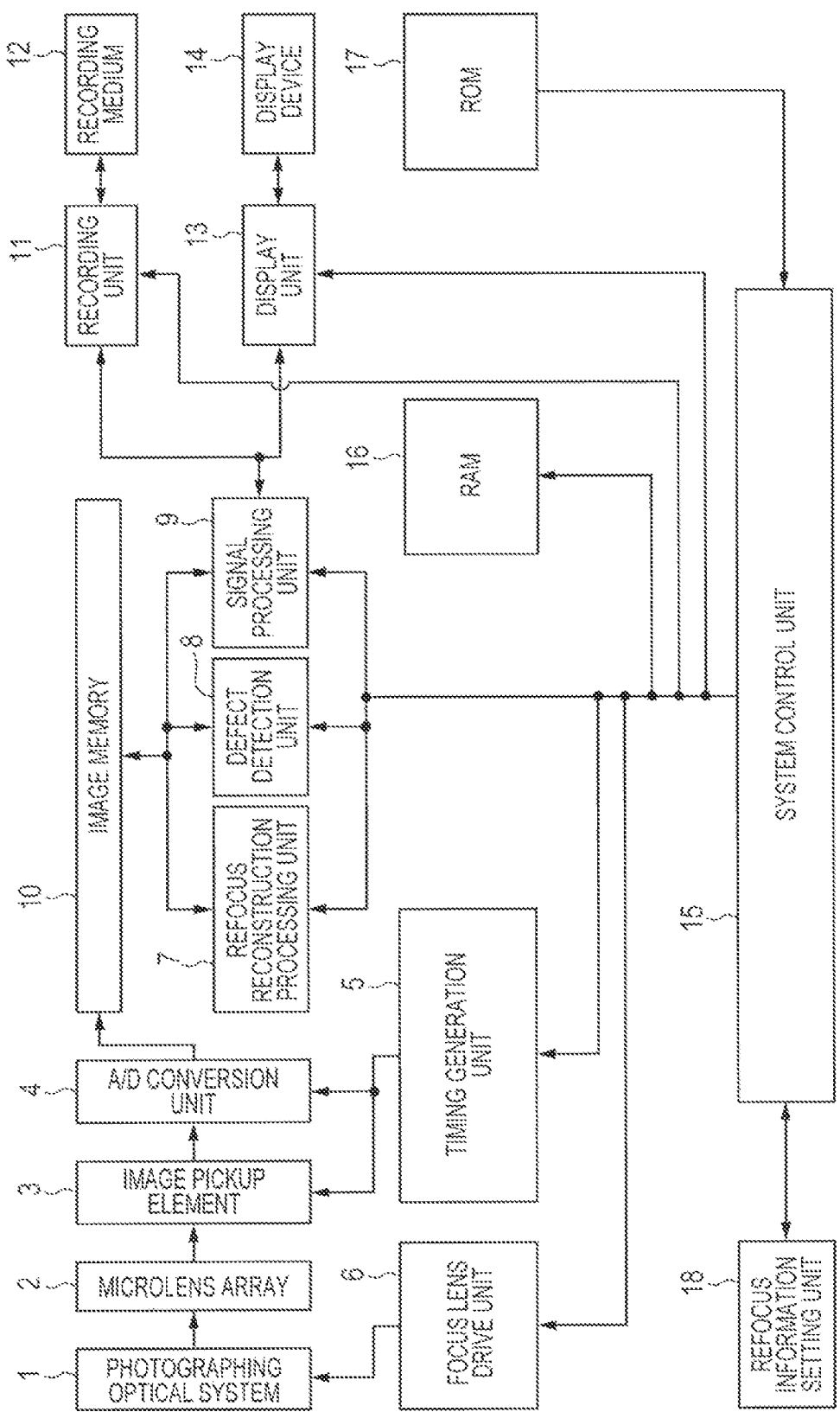
FIG. 1 is a block diagram illustrating a construction of an image pickup apparatus according to the first embodiment of the invention.

FIG. 1 is a block diagram illustrating the whole construction of the image pickup apparatus according to the present embodiment of the invention. In FIG. 1, a photographing optical system 1 includes an iris and a focus lens. An object image is mainly formed at an apex of a microlens array (hereinbelow, abbreviated to "MLA") 2 by the focus lens of the photographing optical system 1. The MLA 2 is constructed in such a manner that microlenses (hereinbelow, abbreviated to "ML") are two-dimensionally arranged horizontally and vertically at a predetermined pitch. An image pickup element 3 photoelectrically converts the object image formed by the photographing optical system 1 and outputs as an electric signal. The image pickup element 3 has: a photoelectric converting function by photoelectric conversion elements which are two-dimensionally arranged horizontally and vertically at a pitch smaller than the pitch of the MLA 2; and a signal transfer function for transferring the electric signals from the photoelectric conversion elements so as to be output as a picked-up image.

An A/D conversion unit 4 converts a sampled analog signal into a digital signal. The digital image pickup signal converted by the A/D conversion unit 4 is stored into an image memory 10. A refocus processing serving as a feature of the light field camera including the invention is executed to the stored picked-up image by a refocus reconstruction processing unit 7 in accordance with necessity. Subsequently, by a defect detection unit 8, a real-time defect detection is performed to a reconstruction image to which the necessary refocus reconstruction processing has been executed. That is, for every pixel constructing the reconstruction image, the defect detection unit 8 discriminates whether or not the pixel is detected as a defect, thereby specifying the defect pixel to be a correction subject. Various kinds of signal processings including a defect pixel correction, a white balance correction, and a gamma correction are executed by on the received result of the real-time defect detection a signal processing unit 9. The final image subjected to the various kinds of signal processings is recorded into a recording medium 12. A recording unit 11 is an interface unit with the recording medium 12. The final image subjected to the various kinds of signal processings can be also directly displayed to an image display device 14 such as a liquid crystal display or the like through a display unit interface 13. The image display device 14 can also perform a live-view display for continuously live-displaying a screen to be image-picked up from now on or a reproduction display of the recorded moving image.

A timing generation unit 5 drives an image pickup system such as an image pickup element 3 or the like. Further, the timing generation unit 5 drives and controls the A/D conversion unit 4 synchronously with the driving of the image pickup system and an output signal of the image pickup element 3. The A/D conversion unit 4 may be mounted in the image pickup element 3. In this case, the picked-up image can be directly recorded into the image memory 10.

A focus lens drive unit 6 drives a focus lens of the photographing optical system 1. Also in the normal image pickup apparatus different from the light field camera, the focus lens is used to focus onto the object and is controlled by the auto focus detection (AF) function or the like, thereby deciding an image formation distance of the photographing optical system 1.

A system control unit 15 executes a program which has temporarily been stored in a volatile memory 16 and controls the whole apparatus.

The nonvolatile memory 17 stores the program and various kinds of data which should be transferred at the time of executing the relevant processing. Defect coordinates to the signals of the photoelectric conversion elements constructing the picked-up image different from the detection subject of the defect detection unit 8 may be recorded into the nonvolatile memory 17.

A refocus information setting unit 18 is a unit for setting refocus information as a parameter for allowing the refocus reconstruction processing peculiar to the light field camera to be executed. The refocus information setting unit 18 is also a unit for selecting an object distance or an object itself and setting a new image formation distance in order to perform the focusing in the light field camera after the photographing in such a situation that even in the case where the focus lens drive unit 6 is controlled by the AF, the operator wants to focus onto another object again or the like. In the embodiment, the refocus information is input through an operating member such as a switch or the like provided for the image pickup apparatus.

The invention is also concerned with the image pickup step that is peculiar to the light field camera and the refocus reconstruction processing which is intimately related thereto. A construction of the invention will be described further in detail hereinbelow.

Figure 2:
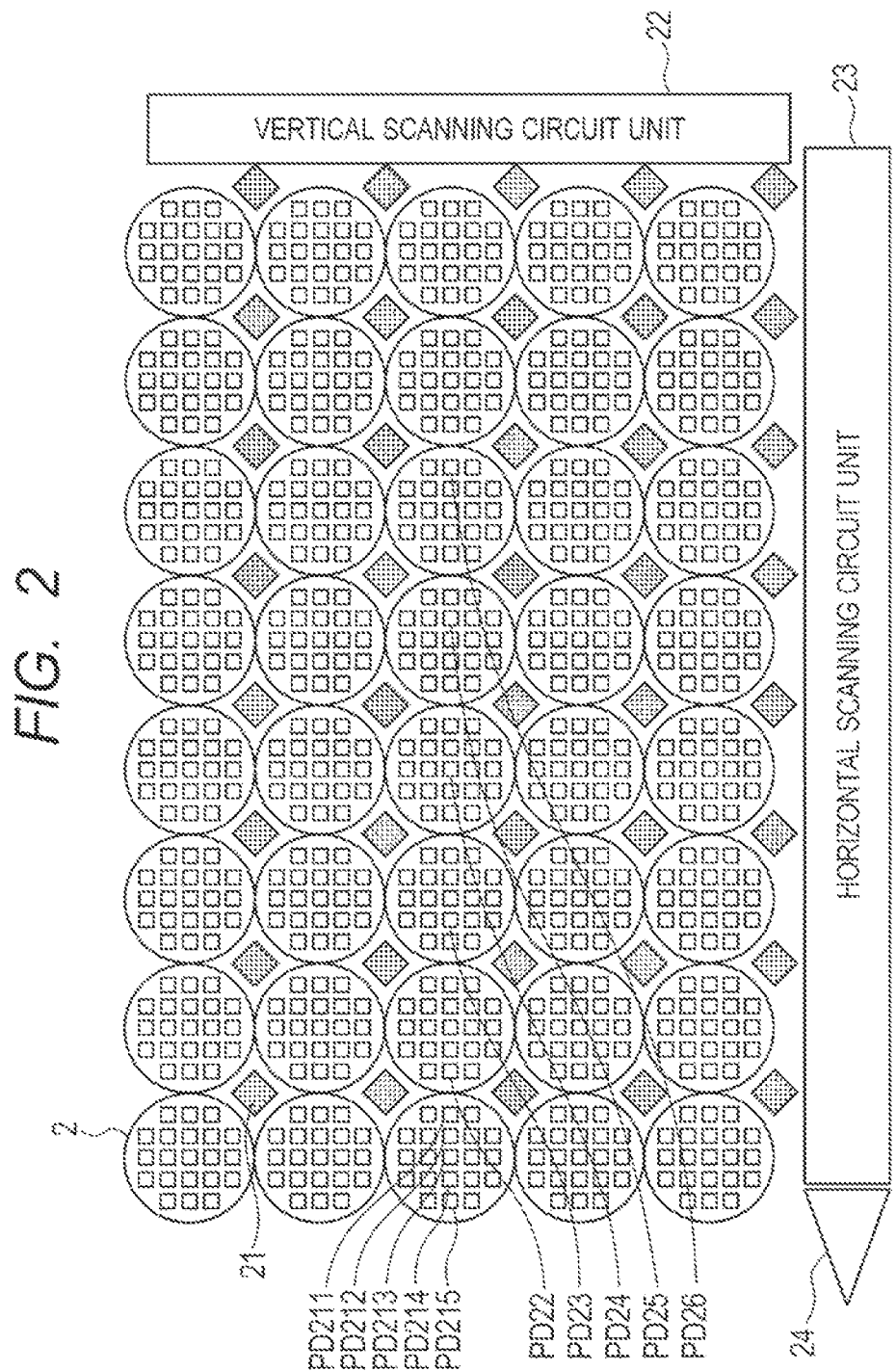
FIG. 2 is a diagram illustrating a plane view of a pixel area of an image pickup element which is used in the image pickup apparatus according to the first embodiment of the invention.

FIG. 2 is a plane view illustrating a pixel area of the image pickup element 3. Although the image pickup element having the MLA 2 in which five MLs are arranged in the vertical direction and eight MLs are arranged in the horizontal direction is illustrated in the diagram for convenience of description, the actual image pickup apparatus has such a construction that in order to accomplish a resolution, which will be described hereinafter, a very large number of MLs are two-dimensionally arranged. This is true of a layout construction of the photoelectric conversion elements. The number of photoelectric conversion elements corresponding to one ML and a layout relation (pupil division) are not limited to those illustrated in the diagram but it is sufficient that at least a plurality of photoelectric conversion elements correspond to one ML. Since the number of photoelectric conversion elements corresponds to a resolving power of the image shift, a resolving power of the pupil division, and a resolving power of the ray directional information, it has been known that the larger the number of photoelectric conversion elements is, the more it contributes to a precision or the like of the refocus reconstruction processing. On the other hand, the resolution of the reconstruction image is concerned with the number of MLs. Therefore, a point that the photoelectric conversion elements of the number enough to assure the precision of the refocus reconstruction processing are mounted while keeping the resolution is one of the problems to be solved for the image pickup element 3.

In FIG. 2, a reference character PD added with an index denotes a photoelectric conversion element. It corresponds to the ML in such a manner that 21 photoelectric conversion elements are included in one ML. The photoelectric conversion element is formed by a method whereby an N-type semiconductor layer is formed onto a P-type semiconductor substrate or a P-type well structure by ion doping or the like. Those photoelectric conversion elements are electrically isolated by all of the neighboring photoelectric conversion elements and a P-type semiconductor area. Therefore, by independently reading out them, the ray directional information forming the construction of the light field camera is obtained. To read out charge signals of the photoelectric conversion elements, a method whereby a CCD of a charge transfer type, an APS (active pixel method)—CMOS type for allowing the camera to have an amplifying function on a pixel unit basis and outputting a voltage signal, or the like is used is considered. The image pickup element 3 in FIG. 2 is illustrated as an example of the APS-CMOS type.

In FIG. 2, a read-out circuit unit 21 having the amplifying function is formed by using a dead space between the photoelectric conversion elements. Although not shown in FIG. 2, the read-out circuit unit 21 is connected to common wirings called vertical output lines or the like in the direction perpendicular to the surface of the diagram.

A horizontal scanning circuit unit 23 is a circuit for executing a horizontal transfer function for sequentially accessing the common wirings in the horizontal direction.

On the other hand, control lines which are common in the horizontal direction (not shown in FIG. 2) are connected to a vertical scanning circuit unit 22. The transfer of signal charges and a charge-voltage conversion or the like by the read-out circuit unit 21 are simultaneously executed to the photoelectric conversion elements of one row. The vertical scanning circuit unit 22 has a function for sequentially setting in the row direction to which row such an operation is executed.

By variably using the functions of the APS-CMOS type image pickup element as mentioned above, a random access to certain photoelectric conversion elements can be partially performed. However, since functions of the scanning circuit system have to be increased there, an influence is also exerted on the costs. Therefore, in many APS-CMOS type image pickup elements, the vertical and horizontal sequential signal read-out operations are executed. That is, the signals of the photoelectric conversion elements serving as various ray directional components are variably arranged in the picked-up image which is read out as mentioned above and to which no refocus reconstruction processings are executed. Such a picked-up image institutes the foregoing first problem in the invention. Even when the user wants to directly perform the real-time detection of the defect pixel, such a picked-up image makes it difficult to distinguish the defect element which should be a correction subject, from the object edge.

Main factors of occurrence of the defect element of the image pickup element 3 will now be described.

A representative example is a dot-like defect element which shines in white and occurs when impurities such as heavy metal pollution or the like mix into the photoelectric conversion element itself, or the like. Another example is a defect element which occurs by the read-out circuit unit 21. That is, it is a defect element showing a signal level change which blinks and such a defect element occurs in the case where a surface level density increases by a damage in a semiconductor manufacturing step at a position near the surface of the semiconductor layer included in the read-out circuit unit and charges are trapped to such a level or are discharged. Such a defect element is also called an RTS noise. Since such a type of defect stochastically occurs in the time direction, it is conspicuous particularly when the same scene in a moving image is observed. Also in a still image, it results in such a phenomenon that a defect which does not appear in a certain photograph image occurs in another photograph image. Therefore, such a construction that such a defect is always stored in a memory or the like as a defect element to be corrected is not so efficient in terms of structure of the image pickup apparatus. Further, although it depends on a construction of the image pickup element 3, in recent years, there is also an example in which the read-out circuit unit 21 is shared by a plurality of photoelectric conversion elements for the purpose of pixel area refinement. In such a case, all of the photoelectric conversion elements which use the read-out circuit unit 21 in which the surface level density has increased are candidates of the defect element. Such a construction that they are uniformly stored as correction subjects is not a desirable state from a viewpoint of the correction image quality. Those points also result in the second and third problems of the invention. Therefore, solving measures have a meaning in the system having a number of photoelectric conversion elements like a light field camera.

Figure 3:
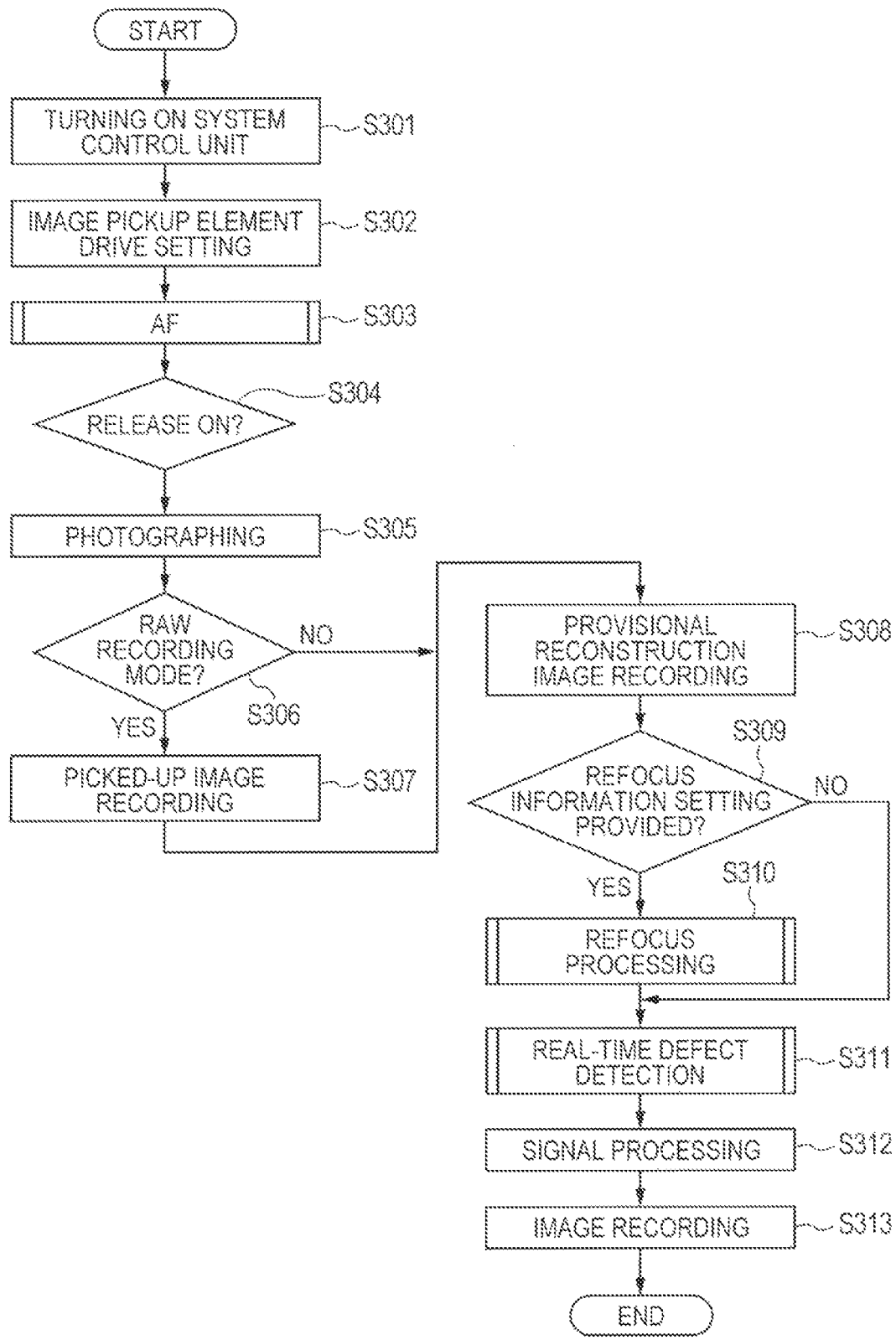
FIG. 3 is a diagram illustrating a flowchart for the operation of the image pickup apparatus according to the first embodiment of the invention.

FIG. 3 is a diagram illustrating a flowchart for the operation of the image pickup apparatus according to the embodiment. This operation is realized by a method whereby a CPU of the system control unit 15 executes the program stored in the nonvolatile memory 17.

A main power source is turned on by a switch (not shown in FIG. 1) and a power source of the system control unit 15 is subsequently turned on (step S301).

Subsequently, a drive setting signal is input to the image pickup element 3 under control of the system control unit 15 (step S302). Thus, a mode in which a live image is continuously displayed to the image display device 14 can be executed.

Subsequently, an auto focus adjustment, what is called, auto focus (AF) for automatically driving the focus lens so as to focus onto the object is started under control of the system control unit 15 (step S303).

As a method of AF, besides a method whereby a contrast detection is used, a method whereby a dedicated distance measurement sensor is used or the like has been known. Further, if the signals of the photoelectric conversion elements existing in the different quadrants under the ML can be properly read out by using the feature of the light field camera according to the invention, they can be also used as signals of the phase-difference detection type AF. The system control unit 15 receives a result of the AF and drives the focus lens of the photographing optical system 1 through the focus lens drive unit 6.

Subsequently, when a depression of a release button (not shown in FIG. 1) is detected (step S304), the system control unit 15 executes the photographing (step S305). After the photographing, the system control unit 15 discriminates whether or not an RAW recording mode is selected by the photographer through a switch device (not shown in FIG. 1) (step S306). If it is determined that the RAW recording mode is selected, the recording in what is called an RAW mode in which the picked-up image is recorded as it is into the recording medium 12 is performed (step S307). After that, irrespective of the selection of the RAW recording mode, for convenience upon setting of a refocus distance, which will be described hereinafter, the signals of the photoelectric conversion elements under the same ML are added up and a provisional reconstruction image having the pixels of the same number as the number of MLs constructing the MLA 2 is generated and recorded (step S308). A thumbnail image obtained by reducing the provisional reconstruction image so as to be displayed to the image display device 14 may be recorded.

After that, when the focus lens position decided in the AF in step S303 differs from a desired position of the photographer, refocus information is designated by the refocus information setting unit 18 (step S309). For example, the object or the like is designated as refocus information from a distance of a target object and the provisional reconstruction image displayed to the image display device 14. When such a designation is detected, the system control unit 15 allows the refocus reconstruction processing unit 7 to execute the refocus reconstruction processing (step S310). If the image is recorded in the RAW recording mode, the refocus reconstruction processing can be also executed after completion of the photographing operation. In this case, it is also possible to allow the computer or the like to execute processings in step S309 and subsequent steps by an image processing apparatus which simulates a part of the image pickup apparatus in FIG. 1, a memory in which such an image processing program has been recorded, or the like.

The refocus reconstruction processing in step S310 will be described in detail with reference to FIG. 4. The refocus reconstruction processing is characterized by a rearrangement, a reconstruction, and an adding-up of the signals of the photoelectric conversion elements in consideration of the ray directional information.

Figure 4:
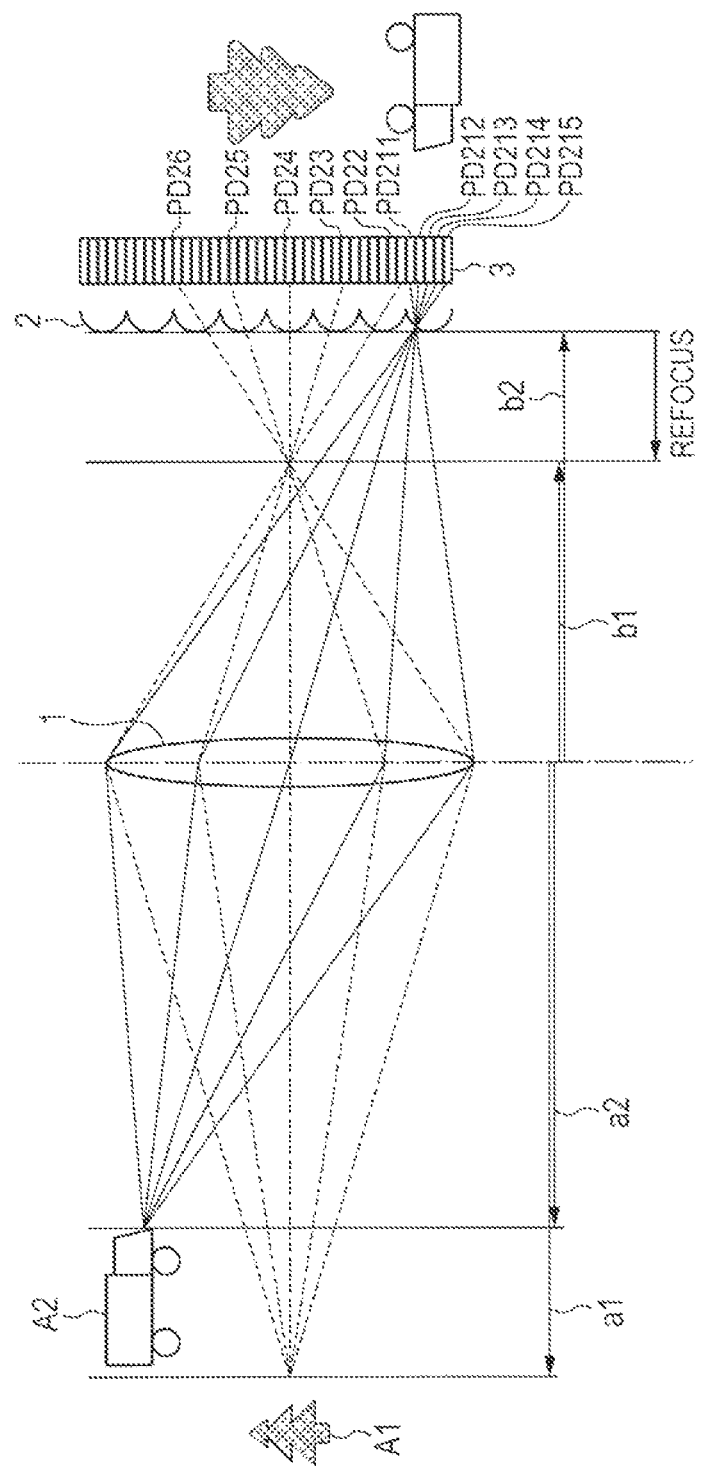
FIG. 4 is a ray diagram for describing a refocus reconstruction processing in the image pickup apparatus according to the first embodiment of the invention.

FIG. 4 is a ray diagram illustrating a state where an image of an object A2 is formed onto an almost summit of the MLA 2 by the image pickup apparatus according to the invention. This ray diagram corresponds to an image formation state upon photographing in step S305. In the diagram, substantially the same component elements as those in FIG. 1 or 2 are designated by the same reference numerals. A reference numeral added to PD on the horizontal line of the image pickup element 3 in FIG. 2 can be regarded as the same reference numeral shown in the row of the photoelectric conversion elements on one line aligned in the image height direction illustrated in the ray diagram of FIG. 4.

In FIG. 4, the photographing optical system 1 (illustrated as one lens for convenience of description) is at a position when the object A2 is photographed in a state where the object A2 being located at an object distance a2 from a principal point is focused. In this case, light beams emitted from one point constructing A2 are collected (solid lines in the diagram) to one point of the summit on the MLA 2 existing at an image formation distance b2 from the principal point of the photographing optical system 1. A relation of the following image formation formula (1) is satisfied between the object distance a2 and the image formation distance b2.

$$1/a2 + 1/b2 = 1/f \tag{1}$$

where, f is a focal length of the photographing optical system 1.

The light beams (solid lines) enter photoelectric conversion elements PD211, PD212, PD213, PD214, and PD215 of the image pickup element 3 arranged behind the MLA 2. The signals of those five photoelectric conversion elements are signals of different ray directional information among the light beams emitted from one point constructing the object A2 toward the photographing optical system 1 as will be understood by tracing back the optical paths. However, so long as the refocus is not performed and the image is obtained at the resolution which is decided by the pitch of the MLA 2, those five signals may be added up. The provisional reconstruction image in step S308 is obtained in this manner.

It is now assumed that in step S309, the photographer set the refocus information regarding an object A1 as a target by operating the refocus information setting unit 18. Light beams (shown by broken lines in the diagram) from one point constructing the object A1 existing at a position away from the principal point of the photographing optical system 1 by an object distance a1 are collected to a position of an image formation distance b1 which is closer to the photographing optical system 1 than b2 as will be obviously understood from the formula (1). Therefore, those light beams enter photoelectric conversion elements PD26, PD25, PD24, PD23, and PD22 disposed behind the different MLs. For example, the light beam which entered PD24 is a ray directional component which passed through an optical axis of the photographing optical system 1. The light beams which entered PD26 and PD22 are ray directional components which passed through an iris aperture end of the photographing optical system 1. PD25 and PD23 are intermediate ray directional components between them. PD24 is an element in the center quadrant among the photoelectric conversion elements disposed behind the ML. PD26 and PD22 are elements in the quadrant of the endmost portion. PD25 and PD23 are elements in the intermediate quadrant. In this manner, among the light beams from one point of the object A1, the light beams which passed through the different pupil areas of the photographing optical system 1 enter the photoelectric conversion elements corresponding to the different ML by the pupil dividing function by the MLA, thereby attaining the image shift.

As for the object being out of focus of the photographing optical system 1 like an object A1, the light beams from one point constructing such an object are photoelectrically converted in the different quadrant of the different ML in accordance with the ray directional information. Therefore, the signals of the photoelectric conversion elements adjacent to each of PD26, PD25, PD24, PD23, and PD22 are light beams of the different ray directional components from another point constructing the object A1. In other words, the image constructed by the signals of the photoelectric conversion elements of a certain quadrant and the image constructed by the signals of the photoelectric conversion elements of another quadrant have such a feature that they correspond to one point constructing the same object of the different ray directional components. An image shift according to a defocus amount occurs.

Further, the refocus reconstruction processing will be described. The processing for refocusing to the image formation distance b1 in FIG. 4 corresponds to such a processing that one point constructing the object (that is, object A1) of the object distance a1 is set to one pixel and the signals of the photoelectric conversion elements are combined. That is, the signals of the photoelectric conversion elements PD26, PD25, PD24, PD23, and PD22 are added up. On the other hand, the signals of the photoelectric conversion elements PD211, PD212, PD213, PD214, and PD215 which are added up in order to obtain the provisional reconstruction image are not added up but are used as information to construct a plurality of different pixels on the image formation distance b1. Thus, the object A2 is displayed as an optically blur image on the image subjected to the refocus reconstruction processing.

Subsequently, in step S311, the system control unit 15 allows the defect detection unit 8 to perform the real-time detection of the defect pixel. In this case, if the refocus information setting is not performed in step S309, the detection of the defect pixel is performed to the provisional reconstruction image in step S308. If the refocus information setting is performed, the detection of the defect pixel is performed to the reconstruction image subjected to the refocus reconstruction processing in step S310.

A method of the real-time detection of the defect pixel in the invention is not limited to the method whereby the pixel having a large level difference from the average value or median value of the peripheral pixels of the same color, that is, the pixel exceeding a threshold value is extracted as a defect pixel. For example, as also mentioned in the description of Patent Literature 2, a method of extracting the defect pixel at a plurality of stages may be used. In the threshold value at the first stage, the defect pixel is not determined but a method whereby after the defect pixel was temporarily stored as a candidate of the defect pixel, with respect to only such a candidate, a range of the peripheral pixel serving as a comparison subject is widened, or the like is also considered. Although there is also a case where the range can be easily widened with respect to the horizontal direction, it directly results in an increase in line memory which is used in the image memory 10 with respect to the vertical direction. Therefore, it is necessary to also pay an attention to the relationship with the costs.

As mentioned above as a main factor of occurrence of the defect element, there is an intimate relation between the RTS noise and the surface level density of the read-out circuit unit 21. On the other hand, in the recent CMOS-APS type image pickup element, the read-out circuit unit 21 is shared by a plurality of photoelectric conversion elements in order to satisfy a request for refinement. Therefore, in the case where the neighborhood photoelectric conversion elements are read out together with those elements through the read-out circuit unit 21 of the high surface level density, a case where a defect due to the RTS noise occurred in the signal of any of the photoelectric conversion elements is considered. When a refocus movement amount is small, the element signals in which those defects occurred are reconstructed as one pixel or a small number of pixels. On the other hand, a fact that the refocus movement amount is large suggests that upon reconstruction, a possibility that the element signals in which those defects occurred spread thinly and widely into a wide image range is high.

Therefore, if the refocus information setting is performed, detection parameters of the defect pixel, for example, a size of detection frame and a threshold value may be changed on the basis of the refocus information. This is because when the refocus movement amount is large, since a possibility that the defect spreads and becomes thin is high, if the size of detection frame is widened or the threshold value is decreased, a higher detection precision of the defect pixel can be held. As refocus information, the refocus movement amount and its moving direction are considered. By using both of them or by selectively using them, the detection parameters of the defect pixel are properly changed. Such change control may be performed by the system control unit 15 or may be provided for the defect detection unit 8 as its function. The refocus movement amount is given by an absolute value of a difference between the position of the focus lens and the refocus position.

Finally, in step S312, the system control unit 15 allows the signal processing unit 9 to execute various kinds of signal processings such as correction of the defect pixel, white balance correction, gamma correction, and the like. In step S313, the final image is recorded into the recording medium 12. In this manner, a series of flow in FIG. 3 is finished.

In the image processing apparatus in the image pickup apparatus according to the embodiment mentioned above, the presence or absence of the refocus information setting is discriminated in step S309 and after the necessary refocus reconstruction processing is executed in step S310, the defect pixel is detected to the reconstruction image. Therefore, the invention further contributes to saving of the memory as compared with the case of performing the detection every signal of the photoelectric conversion elements, and a time required for the real-time detection of the defect pixel is not consumed. Moreover, such a difficult problem that the object edge and the defect pixel which should be a correction subject are distinguished from the picked-up image having different ray directional component every quadrant can be also avoided. Further, by changing the detection parameters of the defect pixel on the basis of the refocus information, the fluctuation of the detection precision of the defect pixel that is caused by the difference of the refocus distances can be also decreased.

As mentioned above, in the present embodiment, the image processing apparatus which is used in the image pickup apparatus and the image processing method according to the control method of the image pickup apparatus have been described with reference to FIGS. 1 and 3. However, for example, as an image processing apparatus for processing the picked-up image of the light field camera, if the image pickup unit of the component elements 1 to 6 in FIG. 1 are deleted and if the flow before step S305 in FIG. 3 are deleted, implementation of the present embodiment be provided as such a general image processing apparatus and a program which describes the image processing method to be executed by a computer.

Since the present embodiment is constructed in such a manner that the defect pixel is detected from the pixels constructing the reconstruction image after the refocus reconstruction processing and corrected, the detecting and correcting functions can be efficiently installed, particularly, even to the defect such as RTS noise.

Embodiment 2

Since a dot-like defect which shines in white and occurs fixedly in the coordinates of the photoelectric conversion elements can be managed as coordinates in the pixel area of the image pickup element 3, the coordinate information of the defect pixel can be stored into the memory such as a ROM 17 or the like. In this case, it is more efficient if the correction of the defect element is performed to the picked-up image before executing the refocus reconstruction processing in which the rearrangement, reconstruction, and adding-up of the signals of the photoelectric conversion elements are performed as a prerequisite. Such a construction that the correction of the defect pixel is performed together with the real-time detection and correction of the defect pixel in the first embodiment in accordance with the features of the correction subject and the defect will be described as a second embodiment hereinbelow.

Figure 5:
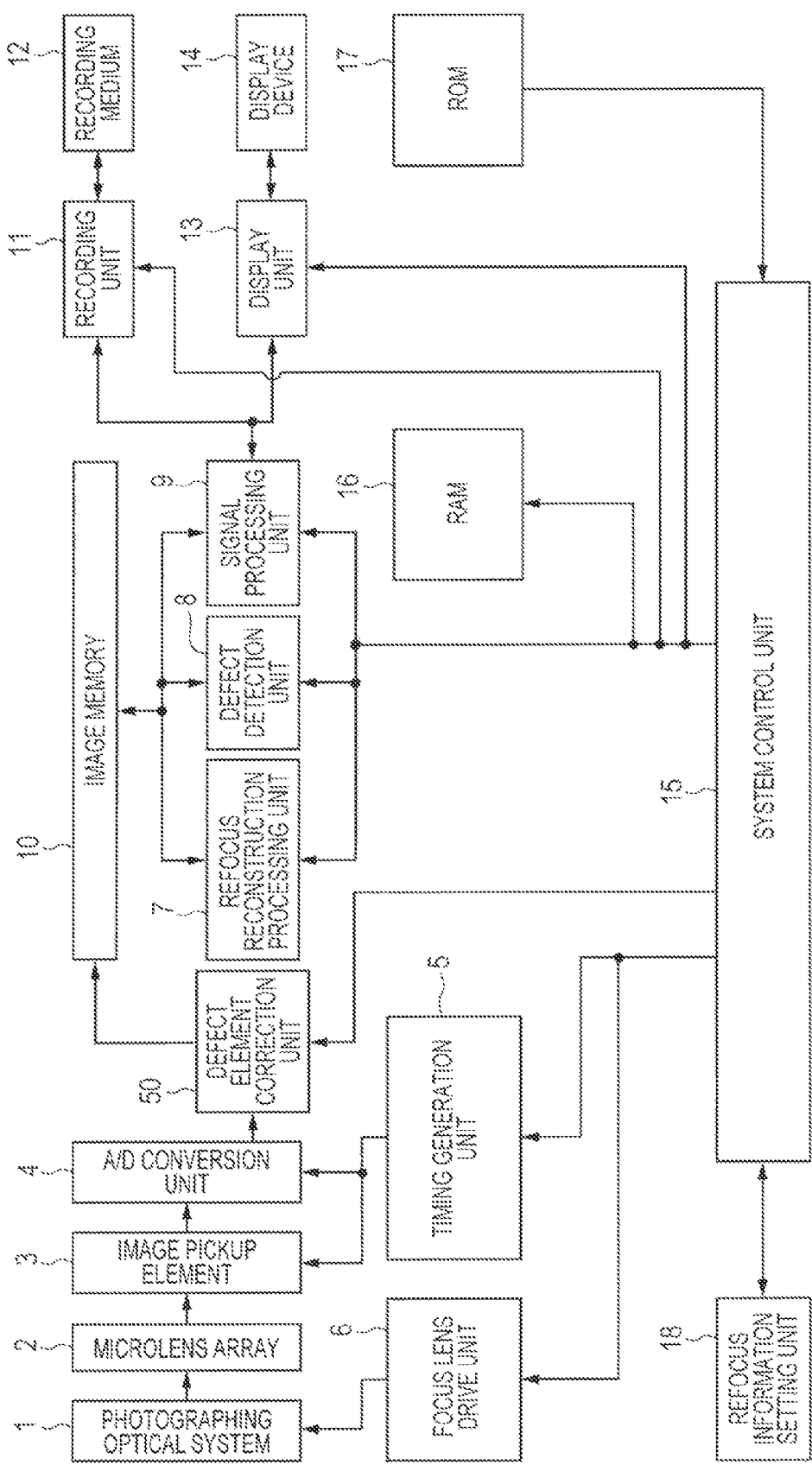
FIG. 5 is a block diagram illustrating a construction of an image pickup apparatus according to the second embodiment of the invention.

FIG. 5 is a block diagram illustrating a construction of an image pickup apparatus according to the second embodiment. FIG. 5 differs from FIG. 1 with respect to a point that a defect element correction unit 50 for correcting a defect element on the basis of the coordinates of the defect element stored in the ROM 17 is provided in correspondence to the signals of the photoelectric conversion elements constructing the picked-up image provided through the A/D conversion unit 4 before the refocus reconstruction processing. Since other component elements are substantially the same as those in the first embodiment, they are designated by the same reference numerals as those in FIG. 1 and their description is omitted here unless otherwise specified in accordance with necessity.

FIG. 6 is a diagram illustrating a flowchart for the operation of the image pickup apparatus according to the second embodiment. FIG. 6 differs from FIG. 3 with respect to a point that in step S601, the correction of the defect pixel is executed to the picked-up image on the basis of the coordinates of the correction subject of the photoelectric conversion elements. Since the recorded coordinates of the defect element correspond to the position of the signal of the photoelectric conversion element of the picked-up image before executing the refocus reconstruction processing in which it is a prerequisite to perform the rearrangement, reconstruction, and adding-up of the signals of the photoelectric conversion elements, it is more efficient if such a processing is executed at the stage of step S601.

A method of the correction in step S601 will now be described.

As a correcting method, for example, a method whereby the coordinates of the correction subject in the picked-up image are selected and the correction by an interpolation processing is executed is considered. As an interpolation processing method, a method whereby in consideration of a fact that the picked-up image includes the ray directional information, the interpolation is performed by using the signals of the photoelectric conversion elements existing in the same quadrant under the different MLs or the like is considered. Naturally, whether or not the object edge is included only in the periphery of the photoelectric conversion element of the correction subject is discriminated and, for example, if no edges exist on the basis of a discrimination result, the interpolation processing using the signals of the adjacent photoelectric conversion elements may be executed. In any of the above cases, since only the signal of the photoelectric conversion element of the coordinates serving as a correction subject is preliminarily processed as a subject, even in the system including a number of photoelectric conversion elements like a light field camera, a processing efficiency is relatively improved.

However, such a processing that the signals of the photoelectric conversion elements which are used in the interpolation processing are selected on the basis of the refocus information in the image reconstruction processing, which will be described hereinafter, and the defect correction is performed is also effective in the case where such a processing is executed together with the real-time defect detection and correction of the reconstruction image. In the embodiment, such a correction processing will be described in detail.

An outline of the correcting method is as follows. First, coordinates on the refocus plane at which the defect pixel is used for reconstruction are obtained. Coordinates of another pixel which are used for reconstruction of the image at the obtained coordinates on the refocus plane are calculated. The correction value is generated from the output value of the pixel at the calculated coordinates. By this method, the correction of the defect pixel can be properly performed to the picked-up image for reconstructing the refocus image. This method will be described in detail hereinbelow with reference to FIGS. 7 to 10.

FIG. 7 is a diagram illustrating a flowchart for the correction processing which is executed by the defect element correction unit 50. With respect to the picked-up image obtained from the image pickup element 3, the defect element correction unit 50 discriminates whether or not the signals of the photoelectric conversion elements relate to the defect element, and corrects the picked-up image in the case of the defect element. This discrimination is performed on the basis of the coordinate information of the defect element which has previously been stored in the ROM 17.

In step S701, the position of the refocus plane is obtained through the setting or the like made in the refocus information setting unit 18. For example, if the photographer designates a refocus distance (object A1) to be set in step S309, the present correction becomes more effective to the reconstruction image. A description will be continued on the assumption that the image formation distance b1 in FIG. 4 is obtained. When the image formation distance b1 is obtained, a refocus coefficient α is obtained as a ratio (b1/b2) between the image formation distances b1 and b2. The refocus coefficient α is a value (α≠0) which changes in accordance with the position of the refocus plane.

In step S702, whether or not the element in the picked-up image which is input is a defect element or a normal element is discriminated on the basis of the coordinate information of the defect element. If the element is the defect element, the processing routine advances to step S703. If the element is the normal element, the processing routine advances to step S706.

In step S703, in order to generate a correction value of the element which is determined as a defect element, the pixel which is used to generate the correction value is selected. First, the coordinates on the refocus plane at which the defect pixel is used for reconstruction of the image are obtained. The coordinates of another pixel which are used for reconstruction of the image on the obtained coordinates on the refocus plane are calculated. The element which is used to generate the correction value is selected from those elements.

In step S704, the correction value to correct the defect element is generated by using the signal of the element for generation of the correction value selected in step S703. In this instance, an arithmetic average of the element for generation of the correction value is used as a correction value. However, a weighting average using a weighting coefficient may be used as a correction value in accordance with the position of the selected element for generation of the correction value in the element array shown in FIG. 2 without limiting to such a correction value. For example, if the weighting coefficient of the element under the ML corresponding to the area out of the effective pupil area of the photographing lens is set to be small, an influence of noises upon generation of the correction value can be decreased.

In step S705, by replacing the output of the defect element with the correction value calculated in S704, the correction is made.

In step S706, whether or not the processings of S702 to S705 are executed with respect to all pixels is discriminated. If they are not executed yet with respect to all pixels, the processing routine is returned to S702 and whether or not the next element is a defect element is discriminated. If it is a final element, the defect correcting operation is finished. Subsequently, a selecting method of the element which is used to generate the correction value in step S703 will be described in detail. A description will be made on the assumption that the element corresponding to a pupil division area $(u_k, p_k)$ of the photographing optical system 1 among the elements under the ML existing at coordinates $(x_k', y_k')$ on the MLA is the defect pixel.

A position on the refocus plane through which the light beam which exits from the pupil division area $(u_k, p_k)$ of the photographing optical system and enters the ML existing at the coordinates $(x_k', y_k')$ on the MLA and is formed as an image to the defect element is set to $(x_k, y_k)$. First, the coordinates $(x_k, y_k)$ are calculated.

FIG. 8 is a conceptual diagram for describing through which coordinates on the refocus plane the light beam which exits from the pupil division area $(u_k, p_k)$ of the photographing optical system and enters the ML existing at the coordinates $(x_k', y_k')$ on the MLA pass. In the diagram, coordinates of the position of the pupil division area of the photographing optical system are set to $(u, v)$, coordinates of the element on the refocus plane are set to $(x, y)$, and coordinates of the position on the MLA are set to $(x', y')$, respectively. A distance from the photographing lens plane to the MLA is set to F and a distance from the photographing optical system to the refocus plane is set to $\alpha \cdot b1$. In the diagram, only the directions of u, x, and x' are shown and directions of v, y, and y' which are perpendicular thereto are omitted here.

As will be understood from FIG. 8, the coordinates $(x_k, y_k)$ through which the light beam on the refocus plane passes can be expressed as shown by the following equation (2).

$$(x_k, y_k) = \left( \frac{\alpha}{1-\alpha}(x_k' - u_k) + u_k, \frac{\alpha}{1-\alpha}(y_k' - v_k) + v_k \right) \quad (2)$$

Therefore, the element which receives each light beam which passes through the same position $(x_k, y_k)$ on the refocus plane shown by the equation (2) is an element which is integrated together with the defect element upon reconstruction of the image. When those pixel outputs are expressed by $L(x', y', u, v)$, $L(x', y', u, v)$ can be expressed as shown by the following equation (4) by using the following equation (3).

$$(x', y') = \left( u + \frac{x-u}{\alpha}, v + \frac{y-v}{\alpha} \right) \quad (3)$$

$$L(x', y', u, v) = L\left( u + \frac{x_k - u}{\alpha}, v + \frac{y_k - v}{\alpha}, u, v \right) \quad (4)$$

where, $(u, v)$ indicates representative coordinates of a pupil division area other than the pupil division area $(u_k, v_k)$ of the light beam which enters the defect element.

For example, a correction value is generated from an average value of four upper, lower, right, and left pixels existing at positions near the defect pixel on the image pickup element among the elements which are used for reconstruction of the image together with the defect element. In this case, it is sufficient to calculate the correction value from the outputs of the four elements which are obtained by substituting $(u_k+d, v_k)$, $(u_k-d, v_k)$, $(u_k, v_k+d)$, and $(u_k, v_k-d)$ into $(u, v)$ in the equation (4).

Note that d denotes an interval between the representative coordinates of the adjacent pupil division areas of the photographing optical system. A distance from the photographing optical system to the MLA is set to b1, a distance from the MLA to the image pickup element is set to f, and a pixel pitch of the image pickup element is set to s. When F numbers of the photographing optical system and the ML are equal, it is sufficient to calculate d as shown by the following equation (5).

$$d = \frac{F}{f} s \quad (5)$$

When the refocus plane is set onto the MLA, that is, when $\alpha=1$, the equation (2) becomes to be not worked out. In this case, since the image of the photographing optical system is formed onto the corresponding element array by the ML, the adjacent elements of the defect element on the element array can be selected as an element used for correction in accordance with a calculating method of the correction value.

Examples of the pixel for generation of the correction value which is selected by the above method is illustrated in FIGS. 9A, 9B, 10A, and 10B.

Figure 9A:
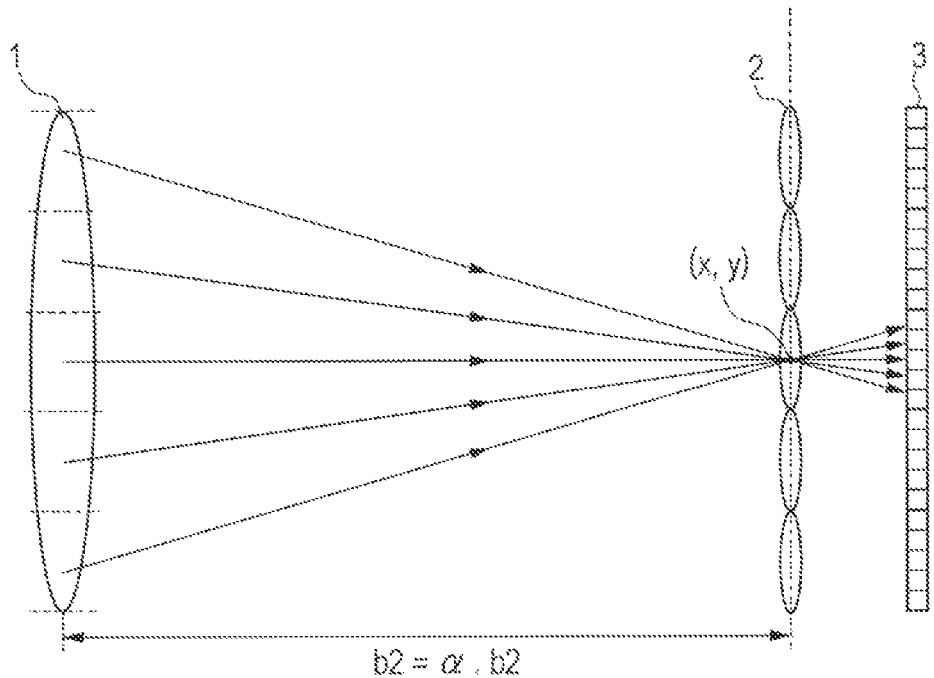
FIGS. 9A and 9B are conceptual diagrams of the light flux which exits from each pupil division area of the photographing lens and, thereafter, passes through a microlens array and enters each pixel of the image pickup element.
Figure 9B:
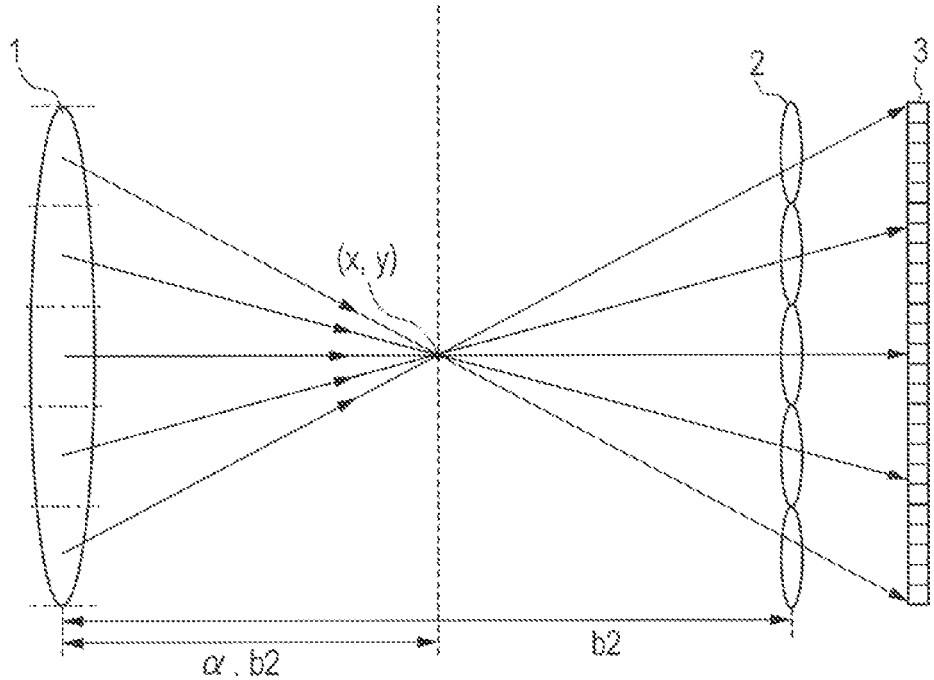
Figure 10A:
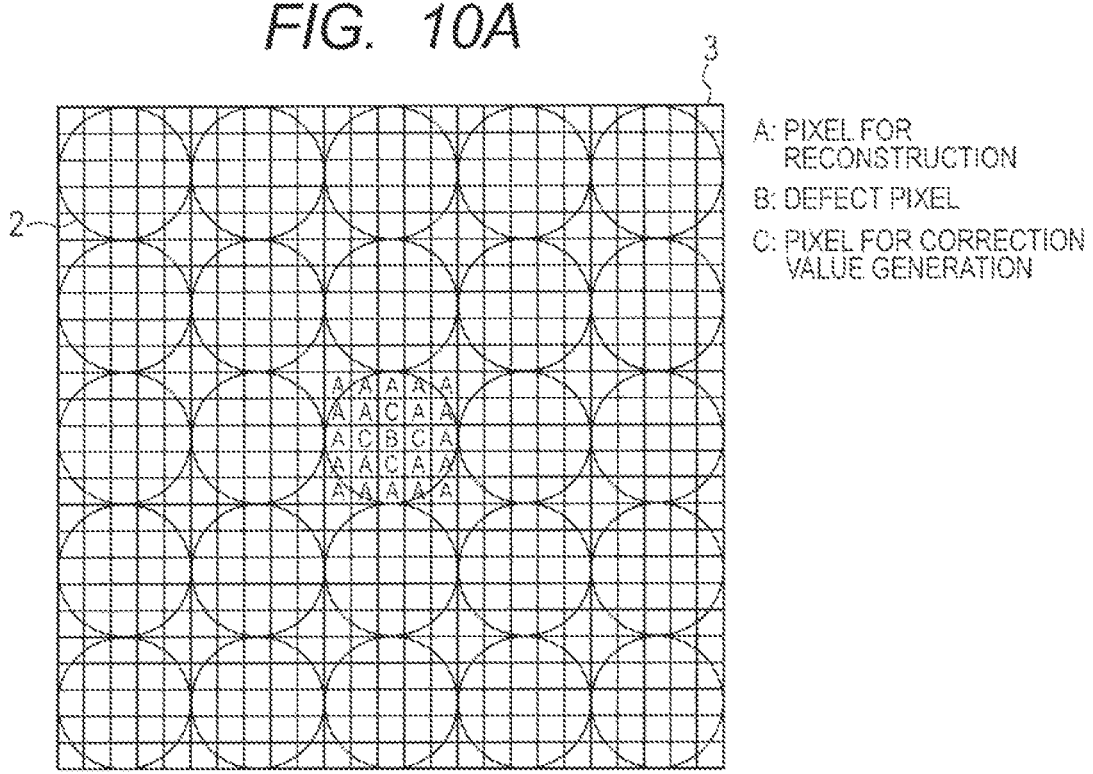
FIGS. 10A and 10B are diagrams illustrating an example of a defect pixel and a pixel which is selected as a pixel used for correction.
Figure 10B:
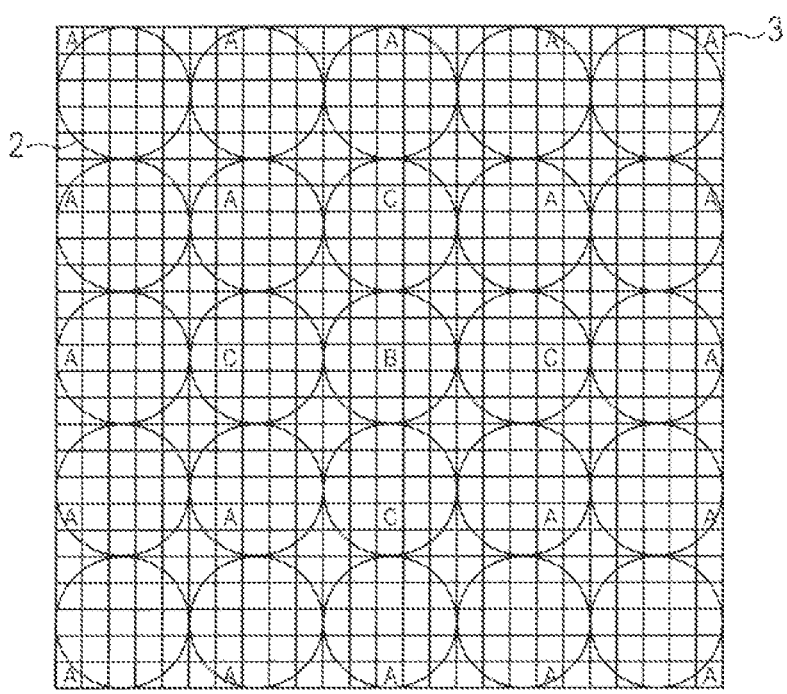

FIGS. 9A and 9B are conceptual diagrams illustrating a state where the light beams emitted from the pupil division areas of the photographing optical system pass through the MLA 2 and enter the photoelectric conversion elements of the image pickup element 3. FIGS. 10A and 10B are conceptual diagrams illustrating a state when the image pickup element 3 and the MLA 2 are seen from the direction of an optical axis.

FIG. 9A illustrates the light beams in the case where the refocus plane is set to the same position as that of the MLA ($\alpha=1$). In this case, the elements which are used to generate the pixel signal of the reconstruction image at the coordinates (x, y) on the refocus plane are elements shown by the pixels A, B, and C in FIG. 10A. When the refocus plane is set onto the MLA, all elements which are used to reconstruct certain coordinates are elements on the same ML. If the element B is a defect element in FIGS. 10A and 10B, the elements for correction value generation of the defect element B are four elements C adjacent to the defect element B. The correction is made by replacing the output of the defect element B with the average value of the four elements C.

On the other hand, the light beams in the case where the refocus plane is set onto the photographing optical system side than the microlens array ($0<\alpha<1$) are as illustrated in FIG. 9B. In this case, the elements which are used to generate the pixel signal of the reconstruction image at the coordinates (x, y) on the refocus plane are elements existing at the remote positions as shown by the elements A, B, and C in FIG. 10B. If the element B is a defect element, the elements which are used for correction value generation of the defect element B are four elements C near the defect element B among the elements which are used to reconstruct the image. The correction is made by replacing the output of the defect element B with the average value of the four elements C.

As illustrated in FIGS. 9A, 9B, 10A, and 10B, even in the correction of the defect element at the same position, the elements which are used to correct the defect element differ in dependence on the position of the refocus plane. The present correction processing enables the proper correction of the defect element to be made in correspondence to such a situation.

According to the foregoing second embodiment, in addition to the technical effect of the first embodiment, the correction of the defect pixel to the reconstruction image can be further properly performed.

Also in this embodiment, in a manner similar to the first embodiment, an image processing apparatus excluding the photographing function or the like or a program which describes the image processing method to be executed by a computer can be provided as an implementation of the present embodiment.

Each unit constructing the image processing apparatus in the embodiments of the invention mentioned above and each processing step of the image processing method can be realized by a method whereby the program stored in the RAM, ROM, or the like of the CPU operates. The program and a computer-readable storage medium in which the program has been stored are incorporated in the invention.

The invention can be also embodied as, for example, a system, an apparatus, a method, a program, a storage medium, or the like. Specifically speaking, the invention can be also applied to a system constructed by a plurality of apparatuses or to an apparatus constructed by one equipment.

The invention incorporates a case where a program of software for realizing the functions of the embodiments as mentioned above (program corresponding to the flowchart of FIG. 3 or 6 in the embodiments) is directly supplied to a system or apparatus or is supplied from a remote place. The invention also incorporates a case where a computer of the system or apparatus reads out and executes a program code of the supplied program.

Therefore, the program code itself which is installed into a computer in order to realize the functions and processings of the invention by the computer also realizes the invention. That is, a computer program itself for realizing the functions and processings of the invention is also incorporated in the invention. In this case, any form such as object code, program which is executed by an interpreter, script data which is supplied to the OS, or the like may be used so long as it has the functions of the program.

As a storage medium for supplying the program, for example, there is a flexible disk, a hard disk, an optical disk, a magnetooptic disk, or the like. Further, there is an MO, a CD-ROM, a CD-R, a CD-RW, a magnetic tape, a nonvolatile memory card, a ROM, a DVD (DVD-ROM, DVD-R), or the like.

As another program supplying method, there is a method whereby a computer is connected to Homepage of Internet by using a browser of a client computer. The program can be also supplied by supplying the computer program itself of the computer from Homepage or by downloading a compressed file including an automatic installing function into a storage medium such as a hard disk or the like.

The program supplying method can be also realized by a method whereby the program code constructing the program of the invention is divided into a plurality of files and each file is downloaded from different Homepage. That is, a WWW server for allowing a plurality of users to download a program file for realizing the functions and processings of the invention by the computer is also incorporated in the invention.

The program supplying method can be also realized by another method whereby the program of the invention is encrypted, stored into the storage medium such as a CD-ROM or the like, and distributed to the users, the users who can clear predetermined conditions are allowed to download key information for decrypting the encryption from Homepage through the Internet, and by using the key information, the encrypted program is executed and installed into the computer.

The functions of the embodiments mentioned above are realized by a method whereby the computer executes the read-out program. Further, the functions of the embodiments mentioned above are also realized by a method whereby the OS or the like which operates on the computer executes a part or all of actual processings on the basis of instructions of the program, and those functions are realized by those processings.

Further, as another method, the functions of the embodiments mentioned above are also realized by a method whereby the program which was read out of the storage medium is written into a memory provided for a function expanding board inserted in a computer or a function expanding unit connected to the computer, a CPU or the like provided for the function expanding board or function expanding unit executes a part or all of actual processings on the basis of instructions of the program, and those functions are realized by those processings.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-186697 filed on Aug. 27, 2012, which is hereby incorporated by reference herein in its entirety.

What is claimed is:

1. An image processing apparatus for processing a picked-up image which is output from an image pickup element which includes a microlens array to obtain the picked-up image including ray directional information of an object image formed by a photographing optical system, the image processing apparatus comprising:
   at least one processor; and
   a memory having instructions stored thereon, which when executed by the at least one processor, cause the at least one processor to:
      obtain the picked-up image output from the image pickup element;
      reconstruct signals of the obtained picked-up image on the basis of the ray directional information to generate a reconstruction image at a refocus plane; and
      detect a defect pixel of the reconstruction image using values of pixels of the reconstruction image, the defect pixel of the reconstruction image being caused by a defect element of a plurality of photoelectric conversion elements constituting the image pickup element.

2. The image processing apparatus according to claim 1, wherein the memory has further instructions stored thereon, which when executed by the at least one processor, cause the at least one processor to correct the detected defect pixel.

3. The image processing apparatus according to claim 2, wherein the memory further stores coordinates of defect elements of the plurality of photoelectric conversion elements constituting the image pickup element and has further instructions stored thereon, which when executed by the at least one processor, cause the at least one processor to correct a signal corresponding to the defect elements constructing the obtained picked-up image on the basis of the coordinates stored in the memory.

4. The image processing apparatus according to claim 3, wherein the memory has further instructions stored thereon, which when executed by the at least one processor, cause the at least one processor to correct the signal corresponding to the defect element on the basis of the information.

5. The image processing apparatus according to claim 1, wherein the memory has further instructions stored thereon, which when executed by the at least one processor, cause the at least one processor to compare a subject pixel with values of peripheral pixels and detect the pixel having level differences corresponding to values of peripheral pixels larger than a threshold value as the defect pixel.

6. The image processing apparatus according to claim 1, wherein the memory has further instructions stored thereon, which when executed by the at least one processor, cause the at least one processor to detect the defect pixel by comparing a value of a subject pixel with values of peripheral pixels of the subject pixel.

7. The image processing apparatus according to claim 1, wherein the memory has further instructions stored thereon, which when executed by the at least one processor, cause the at least one processor to determine the defect pixel having a value larger than values of peripheral pixels of a subject pixel.

8. The image processing apparatus according to claim 1, wherein the memory has further instructions stored thereon, which when executed by the at least one processor, cause the at least one processor to generate the reconstruction image by determining the refocus plane which is a virtual focal plane, reconstruct signals for the refocus plane, and combine signals corresponding to each pixel at the refocus plane respectively.

9. An image processing apparatus for processing a picked-up image which is output from an image pickup element which includes a microlens array to obtain the picked-up image including ray directional information of an object image formed by a photographing optical system, the image processing apparatus comprising:
at least one processor; and
a memory having instructions stored thereon, which when executed by the at least one processor, cause the at least one processor to:
obtain the picked-up image output from the image pickup element;
reconstruct signals of the obtained picked-up image on the basis of the ray directional information to generate a reconstruction image at a refocus plane;
detect a defect pixel of the reconstruction image using values of pixels of the reconstruction image; and
set information in accordance with a refocus plane for the reconstruction of the picked-up image,
wherein in a case where the setting is effected, the defect pixel of the reconstruction image is detected on the basis of the set information.

10. The image processing apparatus according to claim 9, wherein the set information is an image formation distance for the image reconstruction from the photographing optical system, and the memory has further instructions stored thereon, which when executed by the at least one processor, cause the at least one processor to control a detection parameter of the defect pixel on the basis of the set information.

11. The image processing apparatus according to claim 10, wherein the detection parameter is at least one of a size of a detection frame of the defect pixel and a threshold value for discriminating the defect pixel.

12. An image processing method of processing a picked-up image which is output from an image pickup element which includes a microlens array to obtain the picked-up image including ray directional information of an object image formed by a photographing optical system, the image processing method comprising:
obtaining the picked-up image output from the image pickup element;
setting information to reconstruct the obtained picked-up image on the basis of the ray directional information;
reconstructing signals of the obtained picked-up image in accordance with the set information to generate a reconstruction image at a refocus plane;
detecting a defect pixel of the reconstruction image generated in the reconstructing using values of pixels of the reconstruction image, the defect pixel of the reconstruction image being caused by a defect element of a plurality of photoelectric conversion elements constituting the image pickup element; and
correcting the defect pixel detected in the detecting.

13. A non-transitory computer-readable storage medium storing a program code for causing a computer to execute an image processing method of processing a picked-up image which is output from an image which is output from an image pickup element which includes a microlens array to obtain the picked-up image including ray directional information of an object image formed by a photographing optical system, the image processing method comprising:
obtaining the picked-up image output from the image pickup element;
setting information to reconstruct the obtained picked-up image on the basis of the ray directional information;
reconstructing signals of the obtained picked-up image in accordance with the set information to generate a reconstruction image at a refocus plane;
detecting a defect pixel of the reconstruction image generated in the reconstructing using values of pixels of the reconstruction image, the defect pixel of the reconstruction image being caused by a defect element of a plurality of photoelectric conversion elements constituting the image pickup element; and
correcting the defect pixel detected in the detecting.

14. An image pickup apparatus comprising:
an image pickup element which includes a microlens array to obtain a picked-up image including ray directional information of an object image formed by a photographing optical system;
an image processing apparatus for processing a picked-up image which is output from an image pickup element which includes a microlens array to obtain the picked-up image including ray directional information of an object image formed by a photographing optical system, the image processing apparatus including:
at least one processor, and
a memory having instructions stored thereon, which when executed by the at least one processor, cause the at least one processor to:
obtain the picked-up image output from the image pickup element;
reconstruct signals of the obtained picked-up image on the basis of the ray directional information to generate a reconstruction image at a refocus plane; and
detect a defect pixel of the generated reconstruction image using values of pixels of the reconstruction image, the defect pixel of the reconstruction image being caused by a defect element of a plurality of photoelectric conversion elements constituting the image pickup element;

an operating member for receiving an input of a user; and a control unit configured to control the image processing apparatus in accordance with the input of the user received by the operating member.

15. An image processing apparatus for processing a picked-up image which is output from an image pickup element which includes a microlens array to obtain the picked-up image including ray directional information of an object image formed by a photographing optical system, the image processing apparatus comprising:

at least one processor; and a memory having instructions stored thereon, which when executed by the at least one processor, cause the at least one processor to:

obtain the picked-up image output from the image pickup element;

combine, on the basis of the ray directional information and a set focal plane, signals of the obtained picked-up image corresponding to each pixel at the set focal plane to generate an image at the set focal plane; and detect a defect pixel of the generated image using values of pixels of the generated image, the defect pixel of the generated image being caused by a defect element of a plurality of photoelectric conversion elements constituting the image pickup element.

* * * * *